C. A. MILLER.
REVOLVING MAP AND TABLE TOP.
APPLICATION FILED APR. 16, 1914.

1,141,070.

Patented May 25, 1915.
2 SHEETS—SHEET 1.

Witnesses

Inventor
Charles A. Miller
By Victor J. Evans
Attorney

C. A. MILLER.
REVOLVING MAP AND TABLE TOP.
APPLICATION FILED APR. 16, 1914.
1,141,070.
Patented May 25, 1915.
2 SHEETS—SHEET 2.
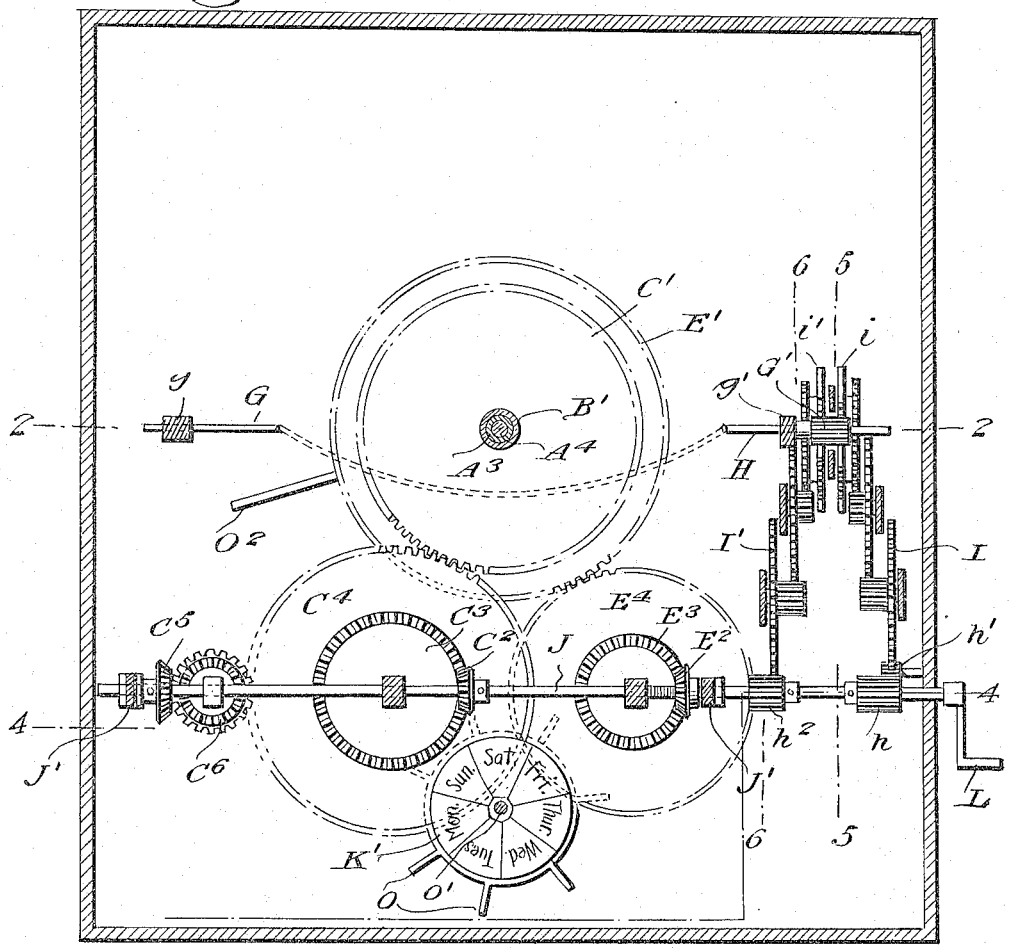
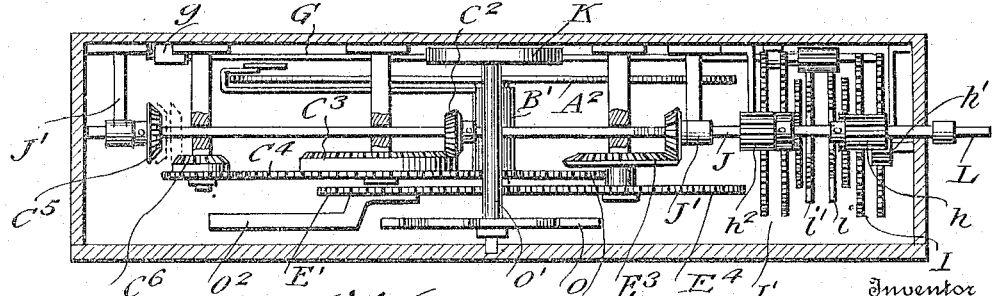
Inventor
Charles A. Miller
By Victor J. Evans
Attorney
Witnesses

UNITED STATES PATENT OFFICE.

CHARLES A. MILLER, OF MARIANNA, FLORIDA.

REVOLVING MAP AND TABLE-TOP.

1,141,070. Specification of Letters Patent. Patented May 25, 1915.

Application filed April 16, 1914. Serial No. 832,265.

*To all whom it may concern:*

Be it known that I, CHARLES A. MILLER, a citizen of the United States, residing at Marianna, in the county of Jackson and State of Florida, have invented new and useful Improvements in Revolving Maps and Table-Tops, of which the following is a specification.

My invention relates to geographical science and school room devices, and is purposed to facilitate the study of mathematical and physical geography in their relations to longitude and time; the variations in the length of the days and nights; the causes of the changing of the seasons, the time of the rising and setting of the sun, throughout the year for all latitudes and places, and the limit of sun light about the earth's surface for all seasons.

My improvements render pleasant, attractive, and interesting the difficult matter of longitude and time as discussed and treated in arithmetics, as well as, problems in dates where hours and minutes and seconds are involved.

My revolving map shows the days of the week at all places throughout the world, and how the calendar is observed at sea. My revolving map shows not only the fact but the reason that seamen loose or gain a day in going around the world and how the matter is adjusted.

My revolving map will indicate at a glance, the relative length of days and nights at various important places in the world and the latitude and longitude can be determined with accuracy and despatch for all places, and yet my revolving map serves as a table top, and is therefore, always at hand, ready for use and service and ornament.

I attain these objects and aims by means of the construction illustrated in the accompanying drawing in which:—

Figure 1:
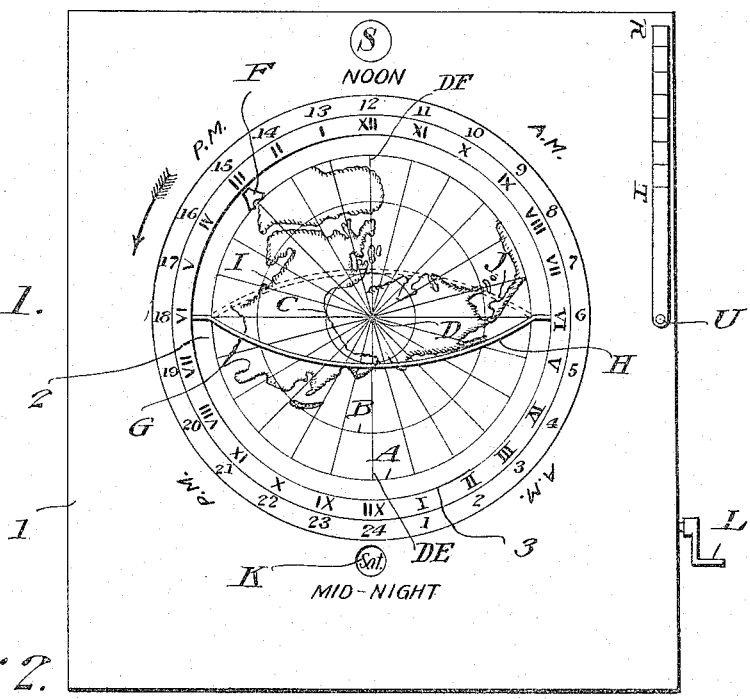
Figure 2:
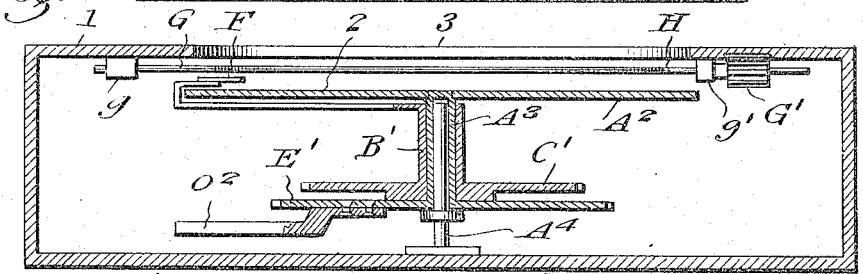
Figures 5, 6:
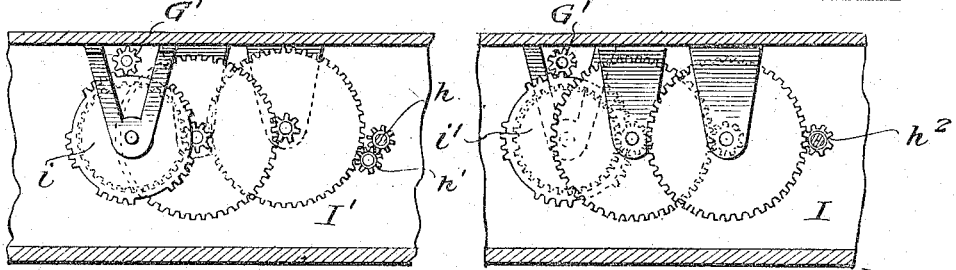

Figure 1 is a top plan view of my improved revolving map and table top. Fig. 2 is a vertical transverse section on the line 2—2 of Fig. 3. Fig. 3 is a sectional plan view showing the internal gearing. Fig. 4 is a section on the line 4—4 of Fig. 3. Figs. 5 and 6 are detail sections on the lines 5—5 and 6—6 of Fig. 3.

I provide a table top 1, in the center of which is the revolving map 2 of the Northern Hemisphere. A large circular opening 3 is made in the center of the table top to admit this map, the plane of whose surface is in the plane of the surface of the table top, in general. Of this map the circular line, A, is the Equator; the circular line, B, is the Tropic of Cancer; while the circular line, C, is the Arctic Circle; and D is the North Pole. The straight line, DE, is the hundred and eightieth (180th) meridian from Greenwich while the straight line DF, is the prime meridian of Greenwich. This map is divided into twenty-four equal parts or sections by means of meridian circles, each section therefore is in width fifteen degrees apart which is equal to the hour of time. Around this map and more or less distant from it is arranged upon the solid part of the table firmly and immovably that part of a dial denoting the hours of the day; the hours are designated by the use of both the Roman and Arabic method of notation. The twelve hours of the morning are numbered successively from one at midnight to twelve at noon; and the twelve hours of the evening are numbered successively from one at noon to twelve at midnight; while the whole twenty-four hours of the day are numbered successively from one, at midnight to twenty-four at midnight, again. This arrangement enables one to know at a glance what hour of the day five p. m. or 11 a. m., etc., is.

G—H is an indicator comprising a bowed wire hinged or pivoted at its ends $g$, $g'$ so as to allow it to be lifted or swung at its middle up and over, until it comes to occupy, and indeed to coincide with the position of the dotted curved line, IJ, at pleasure. The purpose of this wire is to represent the limit of sun light; its present position represents the limit of sun light about June the (21st) twenty-first; and S, is the sun, seen in the distance, filling all that part of the universe with light, and so hiding the stars; but on the side of the earth opposite the sun, are seen the moon, when full, and many stars; this side is night; but when the wire is carried and caused to occupy the position of the dotted line, IJ, it then represents the limit of sun light, about December twenty-first (21st); showing the days to be short and the nights to be long north of the Equator; as well as the time of the rising or setting of the sun, throughout the world. The present position of this wire shows that about June the 21st the sun sets at G, about 6.30 o'clock; while it rises at H, about 4.55 o'clock, in the latitude of about thirty degrees north; at this time, all parts of the Arctic regions have sunlight at one and the same time.

Beneath this map is a system of clock work machinery, by means of which the map is to be revolved, automatically or by turning the crank, L, by hand which will or will not operate the wire as may be desirable on the part of the manufacturer.

The longitude will be shown in figures along the edge of the map near the Equator, while the latitude will also be denoted in figures along some one of the meridians, as DE, and also by the scale of latitude, RT, this being a narrow slat graduated to degrees and pivoted to the table at U. As to its use, suppose we required the exact position of J, with the hand, catch the slat, bringing it around upon its pivot, U, until R, coincided with D, the North Pole, after which revolve the map until J is brought to the edge of this slat or scale; the figures seen upon this scale just above J will indicate the latitude and the figures seen near the Equator in the longitude of J, will indicate its longitude; and its geographical position is, therefore, known.

The days of the week are indicated and shown through an opening in the table at K, where the name of each successive day of the week or its initial letter or letters may be seen. These names or initials appear upon a rotary disk K' divided into seven sections, each section having the initial letters of one of the seven different days of the week, this disk K' with its projecting arms O, is pivoted beneath the dial part, at its center O'. When the crank L is turned to revolve the map, a finger O² projecting from under the map, in line with the international day line, DE, strikes against one of the arms, O, of the disk as the day line passes the midnight point, and turns the disk sufficiently to carry one section from view and at the same time bring another section into view, seen through the opening at K, Fig. 1. Saturday is now shown there, which denotes that it is Saturday throughout the world to the left of the international day line, looking north up to the midnight meridian; and Friday everywhere else throughout the world; but when the day line is made to revolve past the midnight point, again, the disk will be made to rotate sufficiently to carry Saturday from view and bring Sunday into view. This same arrangement can be attached to the map itself, if thought best; and one disk might be placed at each hour angle, notwithstanding the present described arrangement is entirely sufficient.

F, is a finger emerging from between the dial part and the map, and crossing or not crossing the Equator, somewhat, to suit conditions; this finger may be of any material or shape, but is intended to represent a ship, and is so arranged by clock work mechanism beneath the map, that it can be made to assume at least three different rates of speed, one the speed of the map, itself, another faster than the speed of the map, and the third speed slower than the speed of the map; so that when this finger F, called a ship, is moving faster than the map, it would have the apparent movement of a ship sailing east; but when it is made to go slower than the map revolves it has the apparent movement of a ship sailing west; and when it has the speed of the map it would represent a ship lying over or resting in a harbor, waiting upon orders. Now we will call these speeds, waiting on orders, sailing east around the world, and sailing west around the world. When the ship sails east around the world, it gains a day, but when it sails west around the world it will be seen to lose a day. For example: suppose the ship to start around the world from London, sailing west, with just speed enough to get back to London while London has exactly six days, suppose the ship started from London Monday at six o'clock a. m., it would be expected back in London from the west Sunday at six a. m., and the people in London would see the sun rising six successive times from the time the ship sailed away to the eastward, until it made its return from the west; but the people on the ship would notice and observe the sun rising seven days. Now since the sun rose six successive times in London, from the time the ship left until the ship returned, it is clear that the ship made the journey around the world in six days, since the sun rises daily and but once a day; in other words, every time the sun rises is one day, but the people on the ship saw the sun rise seven times, and so had seven days at sea, their first sun rise was Tuesday; second, Wednesday, third Thursday, fourth Friday, fifth Saturday, sixth Sunday, and seventh Monday, so consequently the calendar on the ship shows Monday, 6 a. m. while in London the calendar showed 6 a. m., Sunday; the ship therefore, had to drop a day from its calendar and observe Sunday, again, so as to keep in harmony with the true time as shown in London; this caused the people on board the ship to have two Sundays right together; but the exact opposite is the case when the ship sails west, around the world, the people on such ship will find that they have lost a day on going back to London; they will arrive at London as before at six o'clock a. m. or at sun rise, Sunday, London time; but on the ship it will be six o'clock a. m. Saturday; the ship will, therefore have to add a day to its calendar, and will consequently have no Saturday, at all; but will have Sunday one day earlier than was expected. My revolving map with its ship verifies these facts, showing the reasons therefor. But ships do not wait to complete their voyages around the world, before changing their calendars; this is done of necessity, as soon as they cross the international date line; which my invention shows with the reasons therefor, a proper relative motion of all the parts being obtained by turning the crank L.

The map revolves in the direction of the flying arrow, and may show as much or as little geographical data as may be thought best by the manufacturer; such as grand divisions of land; water; cities; political subdivisions; and principal routes of travel; etc.

As to the mechanism necessary for the operation of this improvement, it will be seen that the finger F is attached firmly to the hollow shaft B', which is firmly affixed to the center of cog wheel, C'.

$A^2$, is a circular platform for supporting the revolving circular map, this platform is supported itself by means of a sleeve $A^3$ journaled on a fixed axis $A^4$ and extending loosely through the shaft B' and the center of the cog wheel C'.

Now, before the platform $A^2$, is fastened to its shaft B', the shaft B' is slipped over the shaft $A^3$; then the platform A, is fastened on with the wire G—G denoting the limit of sunlight, also in position, with its cog wheel. The cog wheel C' is purposed for turning the shaft which carries the finger, F around; while the cog wheel, E' fixed to sleeve $A^3$, is purposed for turning the shaft which carries the map around, and the cog wheel G' at the end of the wire G—H is for the purpose of changing the position of the wire, to represent the changing position of the limit of sunlight, at different seasons.

The crank L is fixed to one end of the shaft J, which is journaled for rotation and slidably mounted in suitable bearings J'. The said shaft has fixed thereto a gear $C^2$ meshing with a gear $C^3$ fixed to a gear $C^4$ and which meshes with the gear C', whereby the finger F is driven. The shaft J also carries a gear $C^5$ which is fixed thereto and is adjustable into and out of mesh with a gear $C^6$, having a beveled toothed surface to mesh with the gear $C^5$ and a spur toothed surface to mesh with the gear $C^4$. The combination gear $C^6$ is normally idle and the gear $C^5$ out of engagement therewith, but by sliding the shaft outward a predetermined distance, the gear $C^5$ may be moved to an active position in mesh with the gear $C^6$ or to an intermediate position in which it is still idle but closer to the gear $C^6$, as indicated by broken lines in Fig. 4. When the gear $C^5$ is adjusted to either of the last two-named positions, the gear $C^2$ is out of mesh with the gear $C^3$, as hereinafter more fully described. The shaft J further carries a beveled gear $E^2$ which has an angular bore to receive an angular portion $j$ of said shaft, whereby the shaft is permitted to slide longitudinally while the gear $E^2$ is fixed thereto to turn therewith. The gear $E^2$ meshes with a beveled gear $E^3$ which is fixed to the gear $E^4$ which meshes with the gear E', whereby in the operation of the shaft J the table map $A^2$ will be turned. Fixed to the shaft J are two gear pinions $h$, $h^2$, which are respectively indirectly and directly in mesh with the actuating gears of a pair of gear trains I and I', which gear trains include final power transmitting mutilated gears $i$ and $i'$, which gears mesh with the gear G' of the indicating device G—H. The teeth of these two gears $i$ and $i'$ are arranged in sets and out of alinement or in alternation with each other, so that when the teeth of one of said gears is in mesh with the gear G' the teeth of the other gear will be idle, and vice versa, said gears alternately coming into operation to shift the indicating device G—H to different indicating positions back and forth above, below and in registry with the equator line to indicate the sunlight positions.

Assuming the position of the gearing to be that shown in Fig. 3, it will be seen that the gears $C^2$ and $E^2$ mesh with the gears $C^3$ and $E^3$, by which the map and finger will be revolved in the direction of the arrow shown in Fig. 1, the map, however, turning at a greater rate of speed than the finger, which moves at a low speed ratio. By sliding the shaft J, however, slightly outward to dispose the gear $C^5$ in its intermediate position, the gear $C^2$ will be moved out of mesh with the gear $C^3$, so that in the rotation of the shaft J the map will be revolved as before, but the gears $C^3$ and $C^4$ will not be positively driven, the map and finger turning together through the frictional engagement between the sleeves $A^3$ and B' and the gears C' and E', so that the finger will revolve with and at the same rate of speed as the map. If the shaft J' is adjusted outward to a still greater degree, however, the gear C' will be moved into engagement with the combination gear C', and hence the gear $C^4$ will be revolved at a greater rate of speed than from the gear $C^2$ and will accordingly revolve the gear C' at a higher rate of speed, so that the finger F will revolve faster than the map. In these sliding adjustments of the shaft J' the gears $h$ and $h'$ maintain an engagement with the associated gears of the trains I and I' while sliding with the shaft, so that the indicator G—H will continue to have the same indicating motion, its speed of motion being governed according to the speed of rotation of the map and remaining fixed with respect thereto and uninfluenced by the variations in the speed of revolution of the rotating finger. It will thus be seen that when the map is revolved the finger, representing the ship, may be revolved therewith at the same speed or a higher or lower speed. The finger may thus be employed to represent a ship lying over waiting on orders, in harbor, going around the world, east, and going around the world, west. Upon each complete revolution of the wheel E' the lug O² engages one of the arms O of the disk K' and turns the latter sufficiently to carry from view the name of the then present day of the week, and to bring into view its successor. During the revolution of the map and finger the gears $i$ and $i'$ are alternately operated to shift the indicator G—H, representing the limit of sunlight, back and forth over the field of the Arctic regions. This movement of the indicator is not to be rapid, but slow, the map making about 36 revolutions to one complete revolution of the indicator; this will correspond to one year. In the operation of the map, therefore, the indicator will be carried back and forth in half rounds, alternately and continuously, representing the limits of sunlight according to the seasons, the indicator serving to denote the variations in the limits of sun light about the earth due to the motion of the earth in its orbit; to denote the time of the rising and setting of the sun in all latitudes throughout the year, to denote the length of days and nights in all latitudes throughout the year, to denote the reasons for the variations in the length of the days and nights for different seasons and latitudes, and to denote the causes for the change of seasons as to heat and cold. Furthermore, my revolving map fully discloses the reasons for crews of steamboats, and railroad trains, having longer days and nights when traveling west, than they do when traveling east. Passengers, going from London to New York, have much longer days and nights, than they have in going from New York to London. A person going from New York to Chicago, would have a day twenty-five hours long, while if he went from Chicago to New York he would have a day of but twenty-three hours in length; still twenty-five and twenty-three equals forty-eight the half of which is twenty-four, which shows that such persons would have but twenty-four hours per day as everyone else.

I claim:—

1. The combination with a revolving map, of a relatively stationary member bearing designations indicating the hour divisions of the day, a device for indicating the days of the week, a movable device for indicating the terrestrial limitations of sunlighted areas about the earth during all seasons, and means for revolving the map and operating said devices in unison.

2. The combination with a table having an opening therein, and bearing indications of the hour divisions of the day around said openings, of a revolving map on view through said opening, an object adapted to revolve about the map, a movable device for indicating the terrestrial limitations of sunlighted areas about the earth during all seasons, and means for operating the aforesaid movable parts.

3. The combination with a table having an opening therein, and bearing designations of the hour divisions of the day around said opening, of a revolving map on view through said opening, a movable week day indicating device, an object movable around the map, a movable device for indicating the terrestrial limitations of sunlighted areas about the earth during all seasons, and means for operating the aforesaid movable parts.

4. The combination with a revolving map, and means for indicating time periods in its course of revolution, of an object movable about the map, and gearing for moving said object at variable speeds with relation to the map.

5. The combination with a revolving map, of a revolving body, and means for revolving said body with the map at the same speed or at greater or less speeds.

6. The combination with a revolving map, of an object mounted to revolve with the map, means normally connecting the map and object for rotation at the same speed, means for revolving the map, and means operated thereby for revolving the object at greater or less speed than the map.

7. The combination with a revolving map, of a revolving object, said map and object being concentrically journaled, gears for transmitting motion thereto, and drive gearing for actuating said gears to revolve the map and object, said gearing being operative to effect the revolution of said object at different speeds with respect to the speed of rotation of the map.

8. The combination with a revolving map, of a sunlight area indicating member movable back and forth across the Arctic regions from side to side of the Arctic Circle of the map, and means for revolving said map and adjusting said member back and forth at different points in the revolution of the map.

9. The combination with a revolving map, of a sunlight area indicating member mounted to swing back and forth across the Arctic regions from side to side of the Arctic Circle of the map, and means for revolving the map and adjusting said indicator.

10. The combination with a revolving map, of a limiting sunlight area indicator, movable back and forth across the face of the map, means for revolving the map, and means operated thereby for alternately adjusting said indicator back and forth, coincident with the line of twilight as its position varies from time to time and from season to season in consequence of the motion of the earth in its orbit.

11. The combination with a revolving map, of a device movable as the map revolves for indicating the sunlight limit according to the changes of the seasons.

12. The combination with a revolving map, of an element bearing a scale of latitude graduated and pivotally attached to the map at one end so as to be adjusted upon its pivot until its number representing its 90th degree of latitude coincides with the North Pole, whereby when the latitude of any place can be told by simply revolving the map beneath it, as substantially set forth.

13. In combination with a circular map, a movable device indicating the changing line of sunlight about the earth's surface as this line of light gradually varies from time to time between the solstices in June and December and conversely upon the surface of the earth as it moves in its orbit.

CHARLES A. MILLER.

Witnesses:
ALBERT W. ROBERTSON,
LEWIS W. WARD.

Copies of this patent may be obtained for five cents each, by addressing the "Commissioner of Patents, Washington, D. C."